March 5, 1968 A. MOELLER 3,371,418
OIL LEVEL TESTING DIP STICK WITH CLOSURE
Filed May 18, 1966 2 Sheets-Sheet 1
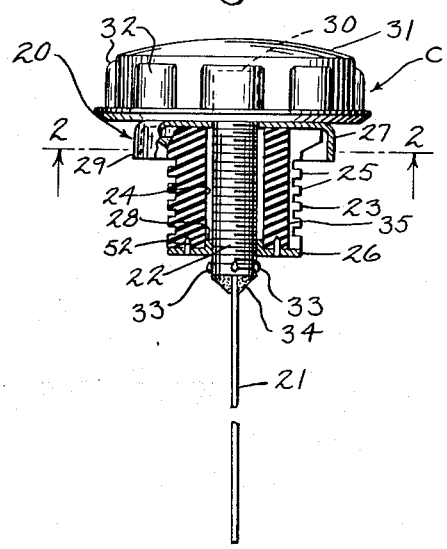
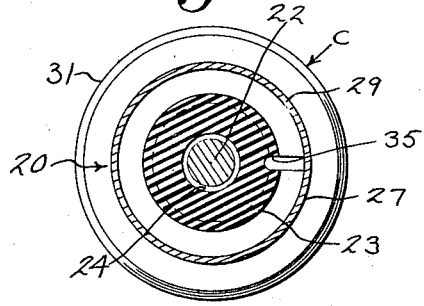
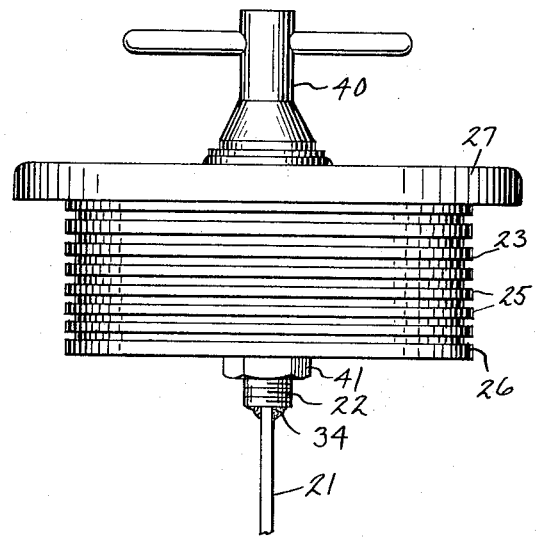
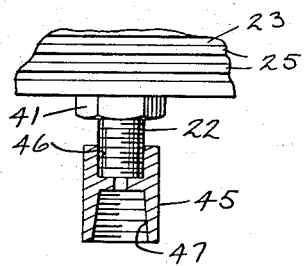
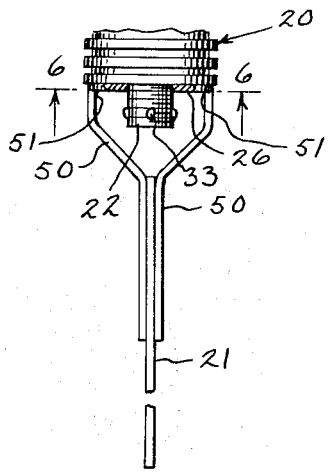
INVENTOR
AXEL MOELLER
BY
GEORGE W. WRIGHT, JR.

March 5, 1968 A. MOELLER 3,371,418
OIL LEVEL TESTING DIP STICK WITH CLOSURE
Filed May 18, 1966 2 Sheets-Sheet 2
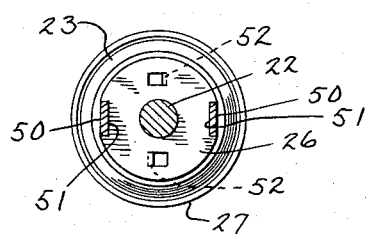
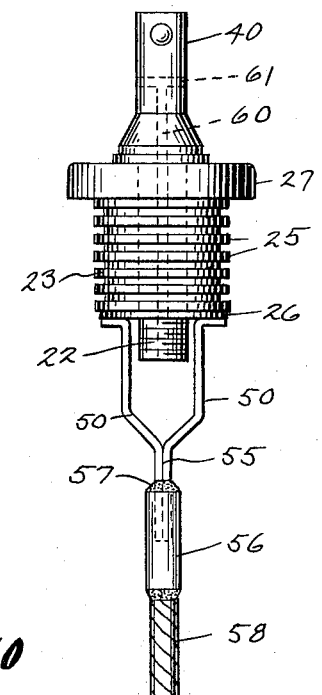
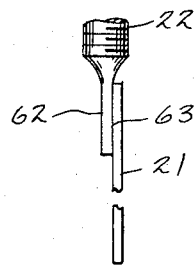
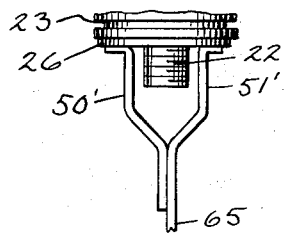
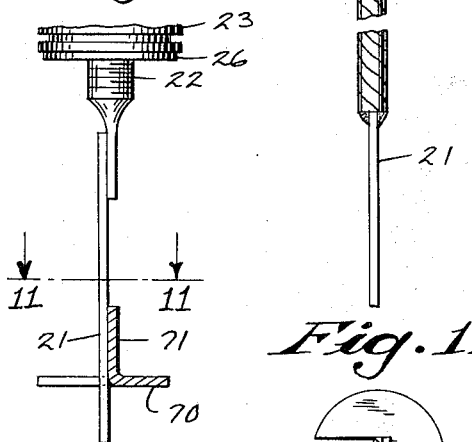
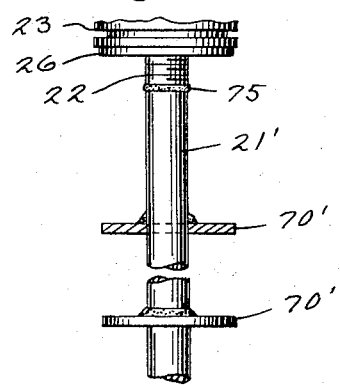
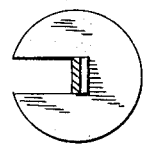
INVENTOR
AXEL MOELLER
BY
GEORGE W. WRIGHT, JR.

United States Patent Office 3,371,418
Patented Mar. 5, 1968

3,371,418
OIL LEVEL TESTING DIP STICK WITH CLOSURE
Axel Moeller, St. Petersburg Beach, Fla., assignor to Moeller Mfg. Co., Inc., Greenville, Miss., a corporation of Wisconsin
Filed May 18, 1966, Ser. No. 551,099
9 Claims. (Cl. 33—126.7)

This invention appertains to a device for internal combustion engines, and more particularly to a novel combination oil level testing dip stick and closure for the entrance pipe of the crankcase of an internal combustion engine.

It is common practice in the automotive art and particularly in heavy equipment vehicles, to provide an oil level dip stick carrying a cap which more or less loosely fits on the outer end of the crankcase oil filling spout of an engine. The ordinary cap as now employed fits loosely onto this spout and thus is subject to disengagement from the spout and under adverse conditions allows dust and dirt and the like to enter the oil filling spout and contaminate the oil. In heavy types of equipment, like tractors, the dip stick which is associated with the filling spout is often jarred loose and becomes lost.

Thus, it is one of the primary objects of my present invention to provide a new, improved, especially adapted oil level testing dip stick, the upper end of which is provided with an expanding stopper plug, which is especially adapted for sealing the entrance pipe leading to the crankcase of an internal combustion engine, to prevent the entrance of dust or dirt into the crankcase and to prevent the loss of the closure incident to engine vibration and the like.

Another salient object of my present invention is to provide a novel closure for an oil level testing dip stick having an inner compression plate for expanding the resilient stopper body, the plate being formed to provide a nut for travelling movement on a rotatable adjusting rod, the plate also having anchoring means engaging the stopper body to prevent the turning movement of the plate relative to the body upon rotation of the adjusting rod.

A further object of my present invention is to provide means where the accidental displacement of the inner compression plate and nut off the end of the threaded adjusting rod will be prevented, particularly upon the turning of the rod for loosening the stopper body in the entrance pipe.

Still another important object of my present invention is to provide novel means for forming the adjusting rod, whereby the oil level dip stick body can be readily attached thereto.

A further object of my present invention is to provide an oil level dip stick with novel means, which when fitted properly in the entrance throat of the filler pipe will prevent the dip stick from coming loose when jarred by engine vibrations and the like.

Still another object of my present invention is to provide means for securing the dip stick to the inner compression plate.

A more specific object of my present invention is to provide means for venting and allowing for the breathing within the crankcase when the dip stick and its closure are firmly fitted in operative position.

Still another object of my present invention is to provide a novel oil level testing dip stick which when in operative position is capable of giving an extremely accurate indication of the oil level in the crankcase.

With the above and other objects in view, the invention consists in the novel construction, arrangement and formation of parts as will be hereinafter more specifically described and claimed, and illustrated in the accompanying drawings, in which drawings, FIGURE 1 is a fragmentary vertical section through the closure portion of the dip stick illustrating certain details in its construction;

FIGURE 2 is a horizontal transverse section taken on the line 2—2 of FIGURE 1 of the drawings and looking in the direction of the arrows;

FIGURE 3 is a side elevational view illustrating another form of my invention;

FIGURE 4 is a fragmentary view illustrating a different means for securing the dip stick body to the rotating rod;

FIGURE 5 is a fragmentary side elevational view illustrating one way of attaching the dip stick body to the inner compression plate;

FIGURE 6 is a transverse horizontal section through that form of the invention illustrated in FIGURE 5 of the drawings, the section being represented by the line 6—6 of FIGURE 5 and looking in the direction of the arrows;

FIGURE 7 is a side elevational view illustrating a means for attaching a flexible type of dip stick body to the closure and illustrating a novel means for venting the crankcase through the closure body per se;

FIGURE 8 is a fragmentary view illustrating still another manner of securing the dip stick body to the threaded rotatable rod;

FIGURE 9 is a fragmentary side elevational view illustrating still another manner of forming the dip stick body and securing the same to the inner compression plate;

FIGURE 10 is a side elevational view generally showing that form of the invention illustrated in FIGURE 8 of the drawings, but further showing a novel means for attaching a guide washer to the dip stick body to provide for a more steady and accurate reading;

FIGURE 11 is a section through the dip stick body shown in FIGURE 10, the section being taken on the line 11—11 of FIGURE 10 and looking in the direction of the arrows, and FIGURE 12 is a fragmentary elevational view of still another form of the invention, certain parts being broken away and in section to illustrate details in its construction.

Referring now to the drawings in detail, wherein similar reference characters designate corresponding parts throughout the several views, the letter C generally indicates my novel oil level testing dip stick illustrating one preferred construction of the closure body 20, and one means for securing the dip stick body 21 to the threaded rotatable rod 22. Thus, in that form of the invention illustrated more particularly in FIGURES 1 and 2 of the drawings, it can be seen that the closure body 20 includes broadly a resilient compressible stopper body 23 having an axially disposed way or bore 24 and outer peripheral sealing ribs 25. The resilient compressible body 23 is confined between the inner and outer compression plates 26 and 27, respectively, and it should be noted that the inner compression plate 26 at its axial center is struck up to provide a cylindrical sleeve or boss 28 which is internally threaded to form a travelling nut on the threaded rotatable rod 22. The outer compression plate 27 may be generally formed with a depending outer peripheral flange 29 and it should be apparent that the rotatable threaded rod 22 extends through the opening formed in the axial center of the outer compression plate 27 and threadedly receives the inner compression plate 26. Secured to the upper end termination 30 of the threaded rod is a handle or knob 31 and in the form of the invention shown in FIGURES 1 and 2, this handle or knob is molded from a plastic to provide a substantially flat body about the outer periphery of which is formed a number of lugs 32 to facilitate the gripping and turning of the same. The general structure of the closure body per se is shown and described in many of my prior patents, among which are: No. 2,729,353; No. 2,347,835; No. 2,315,538 and No. 2,292,149, issued respectively, Jan. 3, 1956; May 2, 1944; Apr. 6, 1943, and Aug. 4, 1942. Therefore, the operation and expansion and compression of the body 23 is well described in these prior patents and need not be further described in detail.

The inner end termination of the rotatable threaded rod may be crimped as indicated by the reference numeral 33 or small weld spots may be placed about the outer periphery. The purpose of these protuberances is to prevent the inner compression plate from moving off the inner end of the rod when the handle or knob 31 is rotated to loosen the compressible body 23. In the form of the invention shown in FIGURES 1 and 2, the dip stick body 21 is secured directly to the inner end of the threaded rotatable rod 22 by welding as indicated by the reference numeral 34. It should also be understood although not shown, that the lower end of the dip stick body is provided with the usual oil level indicia showing the "Full," "Half-Full" and "Add" indications.

It is important, particularly when utilizing heavy equipment that some means be provided so that the inside of the crankcase area can be vented and allowed to breathe. In the form of the invention illustrated in FIGURES 1 and 2, I provide a longitudinally extending groove 35 formed in the outer periphery of the compressible body 23 and suitably notches or grooves must be formed in the inner plate 26 so that the proper venting will take place.

From the description thus far it can be seen, that when it is desired to firmly place the oil dip stick in position relative to the oil filling pipe (not shown), it is merely necessary to fit the compressible body of the closure 20 within the neck or entrance throat of the oil filler pipe and rotate knob 31 to draw the inner compression plate 26 toward the outer compression plate 27. In this manner the resilient compression body will engage the inner walls of the entrance throat and firmly lock the dip stick in position. Thus the entrance of dust and dirt and accidental jarring loose of the dip stick is prevented.

In FIGURE 3 of the drawings I have illustrated another form of the invention and it should be understood, however, that the inner and outer compression plates 26 and 27 respectively, as well as the compressible body 23 and threaded rotatable rod 22 are identical to that form of the invention illustrated in FIGURES 1 and 2. In fact, the dip stick body 21 is secured to the inner end termination of rotatable rod 22 in the same manner and that is by welding at 34 as shown. In this form of the invention, however, in lieu of the molded rotatable knob 31, I utilize a handle 40 and this handle is splined or otherwise rigidly secured to the upper end termination of rod 22 so that by rotating the handle, rod 22 will be rotated and the body compressed between the plates 26 and 27 respectively in the manner above described.

It will be noted also in this form of the invention, in lieu of the crimps 33 I provide a fixed stop nut 41 which prevents the inner movement of plate 26 and secured to the lower end of the dip stick body 21 is a coupling plug 42, one end of which is threaded as at 43 to receive a magnet or the like and the magnet is, of course, useful in extracting bits of metal from the oil per se.

In FIGURE 4 I have illustrated still another means for attaching the dip stick body to the inner end of the threaded rotatable rod 22 and in this form of the invention a coupling 45 is utilized. This coupling is merely in the form of a circular body having an internally threaded portion 46 threaded to the inner end of the rotatable rod 22 and providing a tapered oppositely extending threaded coupling portion 47 to receive the rod body. In this form of the invention the dip stick body could be round or the end of a flexible cable type could be readily secured to the coupling.

In FIGURE 5 of the drawings, I have illustrated still another means for securing the dip stick body 21 to the closure portion 20 and in this form of the invention the dip stick body 21 is secured directly to the inner compression plate 26. Actually, for extremely accurate readings, it is preferable that the dip stick body 20 be secured directly to the rotatable threaded rod 22, since the rod does not move in or out in relation to the oil level of the crankcase, whereas the inner compression plate 26 does travel slightly inwardly and outwardly in relation to the rotatable threaded rod 22. In most instances, this slight movement will not make an appreciable difference in the oil level readings. In any event, the body 21 is secured between two identically formed flat strips of metal 50, and the upper ends of these flat strips are forked outwardly and secured adjacent the outer periphery of the plate 26 by spot welding or the like at the points indicated by the reference numeral 51.

It should also be noted that it is highly desirable and is in fact, a salient feature of this invention, that the compression plate be fixed so that it will not rotate in relation to the compressible body 23. To facilitate this, in that form of the invention illustrated in FIGURES 5 and 6 I provide the struck in tongues 52 which are firmly embedded within the compressible body. These tongues 52 are also utilized in that form shown in FIGURES 1 and 2 of the drawings and in fact in all forms of the invention, the compression plate is secured against relative rotation with the body 23 in some manner.

In FIGURE 7 I illustrate still another type of oil level testing dip stick, and in this form the flat strips are secured to the inner compression plate 26 in substantially the same manner as illustrated in FIGURE 5, except that the inwardly projecting parallel flat portions thereof meet and are joined together as indicated by the reference number 55 to provide a means for securing a coupling 56 thereto. Coupling 56 is provided with the recesses contoured to receive the inner ends of the members 50 and these ends are then welded as at 57. At the other end of coupling 56 I weld or secure a flexible cable 58 and this particular type of dip stick is useful where the oil entrance pipe is other than straight and thus secured to the inner end of the cables 58 is the body 21 carrying the proper indicia for indicating the oil level. In FIGURE 7 I also illustrate a novel means for venting the crankcase through the closure body per se and this is accomplished by providing an axial passageway or bore 60 substantially throughout the entire length of the threaded rod 22. This axial bore could (although not shown) be entirely therethrough, but preferably terminates adjacent the upper end of the handle portion 40 and communicates with a transversely extending aperture 61 to provide for the proper venting as described. If desired the inner end of rotatable rod 22 could be drawn and formed with an inwardly extending flat stud 62 and as shown in FIGURE 8, body 21 could be secured and welded to the stud 62 as at 63.

FIGURE 9 illustrates still another manner of forming the dip stick body and in this particular form I provide a flat strip portion 50' formed identically to the strips 50 shown in FIGURE 7; however, the other strip 51' is extended as at 65 to provide the dip stick body.

As previously mentioned, where it is necessary to have an extremely accurate and reliable oil level indication, it is necessary to secure the dip stick body directly to the rod 22 since the rod 22 does not move inwardly or outwardly with respect to the crankcase and oil level. To provide for an even more accurate measure, since the dip stick may tend to bend off center, I provide a novel guide washer 70 as shown in FIGURES 10 and 11 of the drawings. This guide washer can be secured to the body 21 in any well known manner, but as shown in FIGURES 10 and 11 I merely strike out and bend upwardly a flat section 71 thereof and firmly secure and weld the same to the body 21 intermediate its ends. Incidentally, body 21 is secured to the threaded rotatable rod 22 in the same manner as illustrated in FIGURE 8 of the drawings, and thus since the guide 70 is of substantially the same diameter as the inner compression plate 26, it will be received within the oil filler pipe and by engaging the inner peripheral walls thereof space and hold the body 21 against deformation and thus the level of the oil will be indicated exactly and accurately.

In FIGURE 12 I have shown a round dip stick body 21 and this, of course, is again welded as at 75, to the threaded rotatable rod 22 and if a round rod is used 1 may securely weld thereto sufficient guide washers 70′ and these guide washers are preferably formed with apertures at their axial centers so that they may be slipped over the round rod dip stick body 21′ and welded thereto as indicated.

From the description so far, it can be seen that I have provided a novel oil level testing dip stick wherein the closure portion thereof can be inserted in the oil filling pipe or spout of the internal combustion engine (not shown), and that upon rotation of the knob or handle the stopper body can be expanded into intimate contact with the walls of the pipe or filling spout and thus seal the pipe. With the sealing of the pipe and tight gripping thereof by the stopper the loss of the stopper with its accompanying dip stick is prevented and the crankcase per se is also vented in a proper manner. Therefore, my invention performs a threefold function—it provides a testing dip stick for oil level; secondly, provides means for preventing loss of the stick incident to a rough riding vehicle and thirdly, it facilitates the complete sealing of the filling pipe or spout and prevents the ingress of dust and dirt which might otherwise contaminate the oil.

Attention is again directed to the fact that I have provided an oil level testing dip stick which can be economically manufactured and which will give an extremely accurate indication of the oil level where accurate readings are of utmost importance. Thus, while I have shown and described certain embodiments of my invention, it will be understood that these are merely for the purpose of illustration and description, that various other forms may be devised and that changes may be made in the proportions and minor details of construction, without departing from the spirit of the invention and scope of the appended claims.

What I claim as new is:

1. An oil level testing dip stick having a closure body for sealing the oil filler pipe of an internal combustion engine including, a resilient compressible stopper body having an axial bore therethrough, inner and outer compression plates engaging the opposite ends of said stopper body, the outer compression plate having an axial opening, said inner compression plate having an inwardly struck axially disposed internally threaded sleeve forming a nut, means for anchoring said inner compression plate to said compressible stopper body, a rod rotatably mounted in the opening of the outer compression plate and threaded into the inner compression plate, said rod being continued beyond the inner compression plate and being provided with means to prevent the inner compression plate from moving off the inner end termination of said rod, a dip stick body carried by said closure body, and operating means on the outer end of the rod for turning the same in the inner compression plate.

2. An oil level testing dip stick as set forth in claim 1, wherein means is provided for venting the closure body.

3. An oil level testing dip stick as set forth in claim 1, wherein said means for turning said rod includes a molded knob having a circumference substantially equal to the circumference of the outer compression plate.

4. An oil level testing dip stick as set forth in claim 1, wherein said means for rotating said rod includes a handle secured to the outer end termination of said rod carrying a cross-member.

5. An oil level testing dip stick as set forth in claim 1, wherein said dip stick body is secured directly to the inner end termination of said rotatable rod.

6. An oil level testing dip stick as set forth in claim 5, wherein said rod is provided with a flat end termination to which is welded a flat portion of said dip stick body.

7. An oil level testing dip stick as set forth in claim 5, wherein said dip stick body is provided with a guide washer intermediate its ends having a circumference substantially equal to the circumference of said inner compression plate.

8. An oil level testing dip stick as set forth in claim 1, wherein said dip stick body is secured directly to said inner compression plate.

9. An oil level testing dip stick as set forth in claim 8, wherein said dip stick body is secured directly to said inner compression plate by means of a pair of identically formed flat strips having their ends secured to said plate and of a size and configuration to provide parallel stretches for lower end terminations between which is welded said dip stick body.

References Cited

UNITED STATES PATENTS

| | | | |
|---|---|---|---|
| 1,658,774 | 2/1928 | Taub | 33—126.7 |
| 1,864,138 | 6/1932 | Machonis | 33—126.7 |
| 2,096,358 | 10/1937 | Gautier | 220—93 |
| 2,176,618 | 10/1939 | Wilson | 33—126.7 X |
| 3,296,703 | 1/1967 | Stade et al. | 33—126.7 |

WILLIAM D. MARTIN, Jr., *Primary Examiner.*

LEONARD FORMAN, *Examiner.*